US012344091B2

(12) United States Patent
Hanna et al.

(10) Patent No.: US 12,344,091 B2
(45) Date of Patent: Jul. 1, 2025

(54) INTERLOCK SYSTEM FOR A VEHICLE

(71) Applicant: Clean Start Systems, Inc., Milwaukie, OR (US)

(72) Inventors: Kirk D. Hanna, Portland, OR (US); Jason R. Niklas, Harrison, OH (US); Derek Hanna, Milwaukie, OR (US); Michael C. Shultis, Hurley, NY (US)

(73) Assignee: Clean Start Systems, Inc., Milwaukie, OR (US)

( * ) Notice: Subject to any disclaimer, the term of this patent is extended or adjusted under 35 U.S.C. 154(b) by 564 days.

(21) Appl. No.: 16/596,385

(22) Filed: Oct. 8, 2019

(65) Prior Publication Data

US 2020/0171944 A1 Jun. 4, 2020

Related U.S. Application Data

(60) Provisional application No. 62/774,658, filed on Dec. 3, 2018.

(51) Int. Cl.
*B60K 28/06* (2006.01)
*B60R 25/00* (2013.01)
*B60W 40/08* (2012.01)
*B60W 50/02* (2012.01)
*B60W 50/029* (2012.01)

(52) U.S. Cl.
CPC .......... *B60K 28/063* (2013.01); *B60R 25/007* (2013.01); *B60W 50/02* (2013.01); *B60W 2040/0836* (2013.01); *B60W 2050/0295* (2013.01)

(58) Field of Classification Search
CPC ................ B60K 28/063; B60W 50/02; B60W 2040/0836; B60W 2050/0295; B60W 2050/0075; B60W 2555/80; B60W 2556/45; B60W 2556/50; B60W 50/0098; B60R 25/007
See application file for complete search history.

(56) References Cited

U.S. PATENT DOCUMENTS

| | | | |
|---|---|---|---|
| 5,743,349 | A | 4/1998 | Steinberg |
| 6,097,480 | A | 8/2000 | Kaplan |
| 6,229,908 | B1 | 5/2001 | Edmonds, III et al. |
| 6,748,792 | B1 | 6/2004 | Freund et al. |
| 6,967,581 | B2 | 11/2005 | Karsten |
| 7,256,700 | B1 | 8/2007 | Ruocco et al. |
| 7,299,890 | B2 | 11/2007 | Mobley et al. |
| 7,413,047 | B2 | 8/2008 | Brown et al. |
| 7,823,681 | B2 | 11/2010 | Crespo et al. |

(Continued)

FOREIGN PATENT DOCUMENTS

| | | |
|---|---|---|
| CA | 2606881 C | 7/2012 |
| CA | 2703315 C | 12/2013 |

(Continued)

OTHER PUBLICATIONS

Interlock-7000-pi-9094501-en-master_cellular_network_.pdf (Year: 2018).*

(Continued)

*Primary Examiner* — Thomas Ingram
*Assistant Examiner* — Faris Asim Shaikh
(74) *Attorney, Agent, or Firm* — Chernoff, Vilhauer, McClung & Stenzel LLP

(57) ABSTRACT

An ignition interlock system.

20 Claims, 15 Drawing Sheets

(56) References Cited

U.S. PATENT DOCUMENTS

| | | | |
|---|---|---|---|
| 8,095,193 B2 | 1/2012 | Ridder et al. | |
| 8,957,771 B2 | 2/2015 | Arringdale et al. | |
| 9,228,997 B2 | 1/2016 | Keays | |
| 2002/0087552 A1* | 7/2002 | Applewhite | G06F 21/6227 |
| 2009/0024423 A1* | 1/2009 | Hay | G06Q 10/02 |
| | | | 705/5 |
| 2009/0254898 A1* | 10/2009 | Sareen | G06F 11/1433 |
| | | | 713/1 |
| 2009/0293589 A1* | 12/2009 | Freund | G07C 5/0891 |
| | | | 73/23.3 |
| 2010/0314190 A1* | 12/2010 | Zimmermann | B60K 28/063 |
| | | | 180/272 |
| 2011/0148626 A1* | 6/2011 | Acevedo | G01S 19/42 |
| | | | 340/539.13 |
| 2014/0375480 A1* | 12/2014 | Morgan | H04W 4/021 |
| | | | 340/990 |
| 2015/0008063 A1 | 1/2015 | Walter et al. | |
| 2015/0081327 A1* | 3/2015 | Mooker | G06Q 10/1095 |
| | | | 705/2 |
| 2015/0197151 A1* | 7/2015 | Ballard, Jr. | G01N 33/4972 |
| | | | 180/272 |
| 2015/0212063 A1* | 7/2015 | Wojcik | G06V 40/167 |
| | | | 340/576 |
| 2017/0048209 A1* | 2/2017 | Lohe | G06Q 20/3829 |
| 2018/0024826 A1* | 1/2018 | Caushi | G06F 8/65 |
| | | | 717/172 |
| 2018/0091930 A1* | 3/2018 | Jefferies | G07C 9/00571 |
| 2019/0213559 A1* | 7/2019 | Beltran | G06F 16/9538 |

FOREIGN PATENT DOCUMENTS

| | | | |
|---|---|---|---|
| CN | 201813532 U | * | 4/2011 |
| CN | 106460415 B | | 2/2019 |

OTHER PUBLICATIONS

Intoxalock_eLERT_2016_.pdf (Year: 2016).*
IN-HOM-G2-User-Manual-English-Spanish-Nov-2014.pdf (Year: 2014).*
Translation of CN-201813532-U retrieved from Espacenet on Jun. 8, 2023 (Year: 2023).*

* cited by examiner

CONTINUED FROM FIG. 3A

- 350 DEVICE MANAGEMENT MODULE
  - 352 — DEVICE MANAGEMENT MODULE
  - 353 — LISTING DEVICES
  - 354 — ADDING ADDITIONAL DEVICES
  - 355 — EDITING EXISTING DEVICES
  - 356 — REMOVING EXISTING DEVICES
  - ASSOCIATING DEVICE WITH CLIENT

- 360 VEHICLE MANAGEMENT MODULE
  - 362 — VEHICLE MANAGEMENT MODULE
  - 363 — LISTING VEHICLES
  - 364 — ADDING ADDITIONAL VEHICLES
  - 365 — EDITING EXISTING VEHICLES
  - 366 — REMOVING EXISTING VEHICLES
  - ASSOCIATING DEVICES WITH VEHICLES

- 370 GEOFENCE MANAGEMENT MODULE
  - 372 — GEOFENCE MANAGEMENT MODULE
  - 373 — LISTING GEOFENCES
  - 374 — ADDING ADDITIONAL GEOFENCES
  - 375 — EDITING EXISTING GEOFENCES
  - 376 — REMOVING EXISTING GEOFENCES
  - 378 — ASSOCIATING GEOFENCES WITH CLIENTS
  - VIEW GEOFENCES

- 380 LOCATION MANAGEMENT MODULE
  - 382 — LOCATION MANAGEMENT MODULE
  - 383 — LISTING LOCATIONS
  - 384 — ADDING ADDITIONAL LOCATIONS
  - 385 — EDITING EXISTING LOCATIONS
  - 386 — REMOVING EXISTING LOCATIONS
  - 388 — ASSOCIATING LOCATIONS WITH DEVICES
  - 389 — SCHEDULE APPOINTMENTS
  - CLIENT ALERTS

CONTINUED FROM FIG. 3B

- 390 REPAIR MANAGEMENT MODULE
  - 393 — LISTING OF REPAIR LOCATIONS
  - 393 — ADDING ADDITIONAL REPAIR LOCATIONS
  - 394 — EDITING EXISTING REPAIR LOCATIONS
  - 395 — REMOVING EXISTING REPAIR LOCATIONS
  - 396 — ASSOCIATING REPAIR LOCATIONS WITH DEVICES
  - 398 — SCHEDULE REPAIR LOCATION APPOINTMENTS
  - 399 — CLIENT ALERTS

- 400 VEHICLE MANAGEMENT MODULE
  - 402 — LISTING VEHICLES
  - 403 — ADDING ADDITIONAL VEHICLES
  - 404 — EDITING EXISTING VEHICLES
  - 405 — REMOVING EXISTING VEHICLES
  - 406 — ASSOCIATING DEVICES WITH VEHICLES

- 410 RESTRICTED DRIVING MODULE
  - 412 — LISTING RESTRICTION VIOLATIONS
  - 413 — ADDING RESTRICTION VIOLATIONS
  - 414 — EDITING RESTRICTION VIOLATIONS
  - 415 — REMOVING RESTRICTION VIOLATIONS
  - 416 — ASSOCIATING RESTRICTION VIOLATIONS WITH CLIENTS

- 420 STATE REPORTING MODULE
  - 422 — LISTING REPORTING RECORDS
  - 423 — ADDING REPORTING RECORDS
  - 424 — EDITING REPORTING RECORDS
  - 425 — REMOVING REPORTING RECORDS
  - 426 — ASSOCIATING REPORTING RECORDS WITH DEVICES

CONTINUED FROM FIG. 3C

INTERLOCK SYSTEM FOR A VEHICLE

CROSS-REFERENCE TO RELATED APPLICATIONS

This application claims the benefit of U.S. Provisional Application No. 62/774,658 filed Dec. 3, 2018.

BACKGROUND OF THE INVENTION

The present application relates to an ignition interlock system.

There are a variety of different interlock devices that selectively inhibit the operation of a vehicle while being mentally and/or physically impaired as a result of the consumption of alcoholic beverages. In general, the interlock devices utilize a breath alcohol analyzer device, which determines the alcohol level in an individual's breath which is correlated to the alcohol level in the individual's bloodstream. Based upon the individual's alcohol level, the interlock device selectively controls whether or not the ignition will start the vehicle.

While the particular configuration may vary, in general the ignition interlock device interrupts the signal from the ignition to the starter until a valid breath sample is provided. When a valid breath sample is provided, the vehicle may then be started in the normal manner. To provide additional effectiveness, at random times after the vehicle has been started, the ignition interlock device may require another breath sample for continued use, generally referred to as a rolling retest. The purpose of the rolling retest is to reduce the likelihood of someone else providing the breath sample than the driver. If the result of the rolling retest exceeds the valid breath sample, then the ignition interlock device typically logs the failed event, warns the driver of the failed event, and then subsequently starts up an alarm notice in accordance with state regulations. For example, the alarm notice may be flashing lights, horn honking, or otherwise, which occurs until the ignition is turned off or a valid breath sample is provided. Normally, for safety reasons, the ignition interlock device will not simply turn off the engine of the vehicle in the event of a failed event for a rolling retest due to safety considerations.

Many states require those convicted of offenses related to driving under the influence to install ignition interlock devices as a condition of having their license not to be revoked, suspended, or otherwise reinstated. Some states may require all offenders to install an ignition interlock device, other states may require repeat offenders to install an ignition interlock device, while other states permit judges to decide based upon circumstances of a particular case. In addition, some states permit a person to obtain limited driving privileges for going to and from places, like work and school, while a license is suspended.

While the interlock devices maintain a record of the activity of the device and the interlocked vehicle, the interlock device is calibrated at regular intervals, such as 30, 60, or 90 day intervals. The calibration may involve the use of a known alcoholic gas and/or alcoholic solution. The log activity may be examined during such recalibration processes to determine if violations are detected, which may result in implementing additional sanctions.

While many of the interlock systems available today can ascertain whether a certain preset breath alcohol reading limit of the person exhaling into the breath alcohol analyzer device has been exceeded or not, these systems suffer from an inability to manage the interlock devices in an effective manner.

BRIEF DESCRIPTION OF THE DRAWINGS

FIGS. 3A-3D illustrate an administrative portal.

DETAILED DESCRIPTION OF PREFERRED EMBODIMENTS

On a periodic basis, the ignition interlock device may require updated firmware for its operation. By way of example, it may be desirable to include modified options for the user's operation for the ignition interlock device, it may be desirable to include modified calibration options for the ignition interlock device, or otherwise provide features in conformance with particular laws of a State or in conformance with changes in a particular law of a State for the ignition interlock device. While the ignition interlock device may be returned to the service center for updating its firmware, this is a burdensome process when a large number of devices are being used across a large geographic region.

Figure 1:
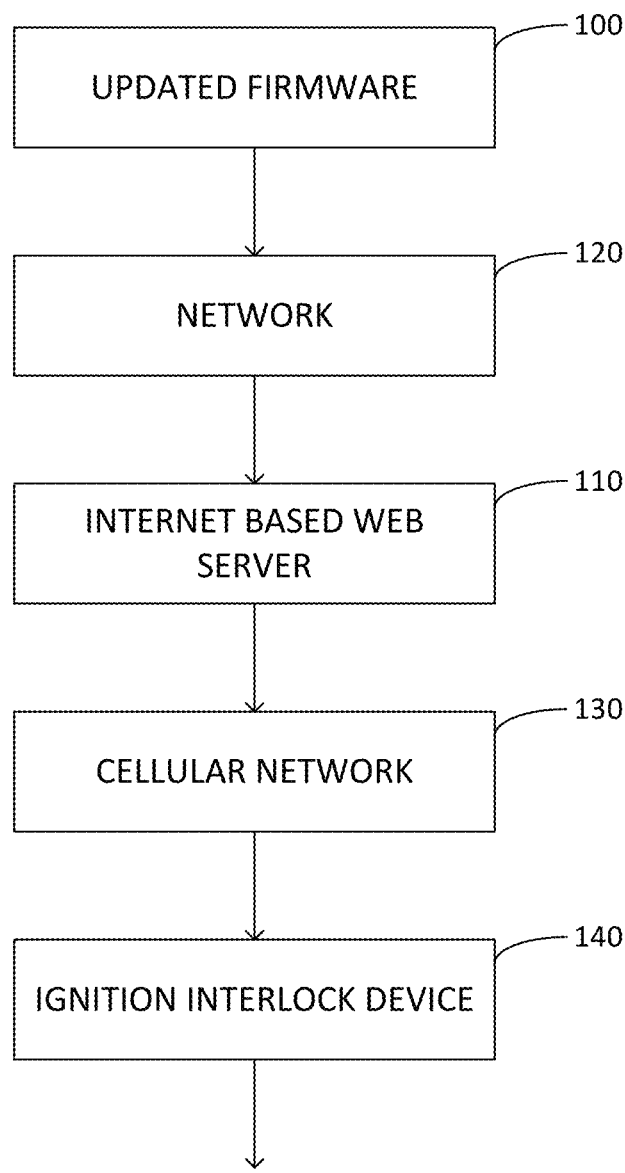
FIG. 1 illustrates an ignition interlock device system.

Referring to FIG. 1, one technique for upgrading the firmware of the ignition interlock devices is shown. A digital package containing updated firmware 100 is provided to an Internet based web server 110 across a network 120, such as the Internet. The web server 110 may provide the digital package containing updated firmware 100 through a cellular network 130 to an ignition interlock device 140, such as 4G or 5G LTE network. The use of the cellular network 130 permits flexible timing for forcing updates. The ignition interlock device 140 may verify that the update is properly configured and is not otherwise tampered with, installed properly on the ignition interlock device 140, and typically the ignition interlock device 140 is then automatically rebooted to ensure the new software is configured properly.

Figure 2:
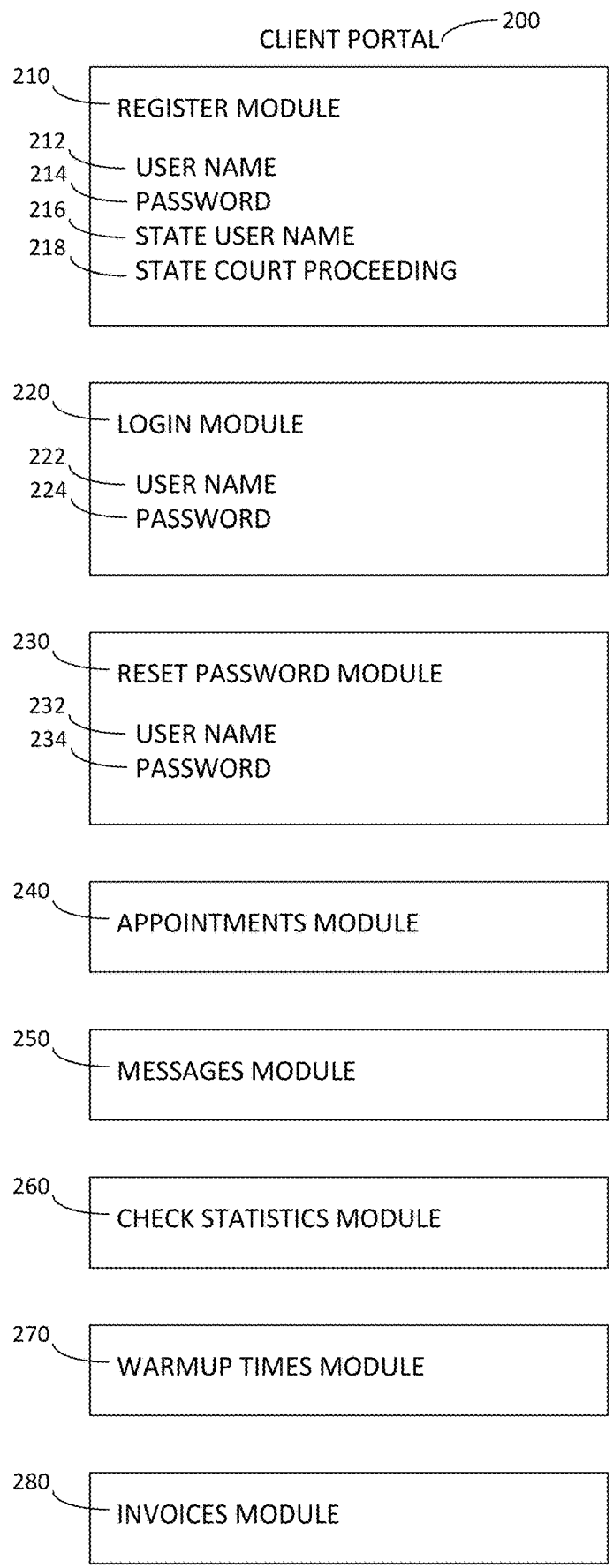
FIG. 2 illustrates a client portal.
Figure 3A:
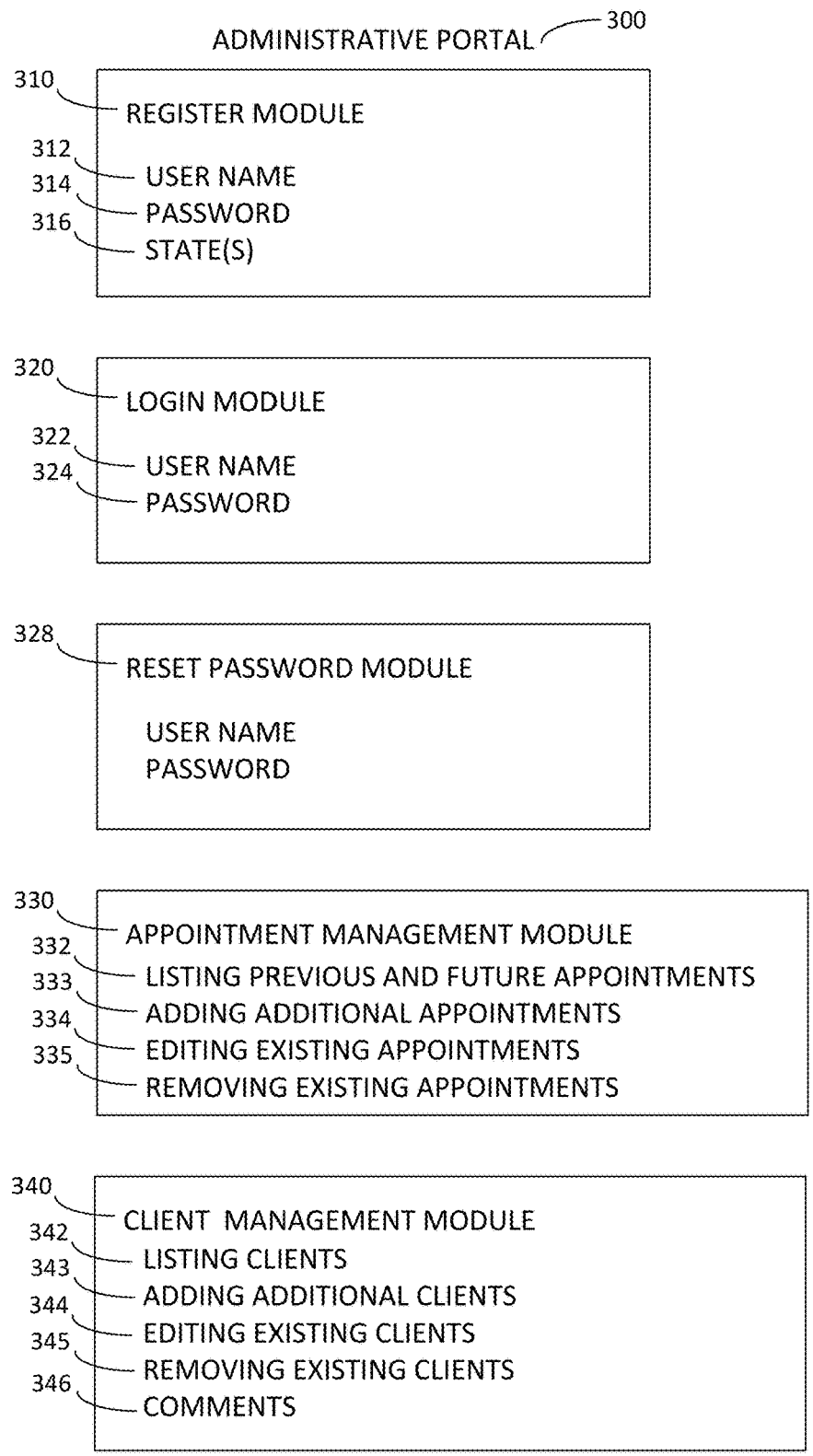
Figure 3D:
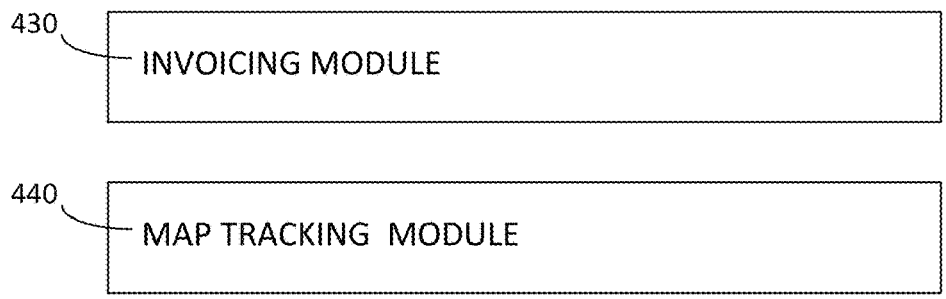

Referring to FIG. 2, it is desirable for a user of an ignition interlock device to have an Internet based client portal 200 that may be accessed by any network enabled device, such as a mobile phone, computer tablet, laptop computer, and/or desktop computer. The Internet based portal may be in the form of a webpage, a progressive web application, a desktop/laptop/tablet based application, a mobile device based application, or otherwise. Data from the ignition interlock device may be uploaded in any suitable manner to the Internet based client portal 200. Data from the Internet based client portal 200 may be downloaded in any suitable manner to the ignition interlock device.

The client portal 200 may include a register module 210. The register module 210 permits the user to register with the system, preferably with a combination of a user name 212 and a password 214. Preferably, the user name 212 was set up by an administrator prior to the user registering through the client portal 200. The registration also preferably includes the user identifying the state in which the user lives 216 and/or has a State court proceeding 218 that necessitated the use of the ignition interlock device. The identification of the State and/or State proceeding may be used as the basis for what firmware and/or options within the firmware are downloaded and/or enabled for the interlock ignition device. In this manner, the same ignition interlock device may be configured in a manner consistent with a particular State. In this manner, the same ignition interlock device may be configured in a manner consistent with a particular State Court proceeding. Also, the system may verify that the State and/or State Court proceeding entered by the client is consistent with a State and/or State Court proceeding by administrator prior to the user registering through the client portal 200. Also, the client portal 200 may be configured in a manner consistent with a particular State.

The client portal 200 may include a login module 220. The login module 220 permits the user to log into the system, preferably using the combination of a user name 222 and a password 224 that the user selected as a result of their use of the register module 210. The user based upon their status as a user is permitted to access portions of the system and not permitted to access other portions of the system.

The client portal 200 may include a reset password module 230. The reset password module 230 permits the user to reset their password to use the system. Preferably, the system requires the user to enter their user name 232, in which a two-factor authentication is used to then reset the password 234, such as a text message, phone call, or e-mail message.

The client portal 200 may include an appointments module 240. The appointments module 240 may include a calendar or a list of related appointments, preferably including date and time, that the user had in the past and has in the future. The appointments may include, a date, a time, and a location at which the user has parole officer and judicial appointments, and the user has calibration appointments for the ignition interlock device. These calendar appointments may be set up by the client and/or the administrator.

The client portal 200 may include a messages module 250. The messages module 250 may be used by the user to send and receive messages, preferably in a secure and private manner, with others. The messages module 250 may include an interface that permits sending and receiving messages from a parole officer. The messages module 250 may include an interface that permits sending and receiving messages from an administrator of the system. The messages module 250 may include an interface that permits sending and receiving messages from a Judge or court staff. The messages module 250 may include an interface that permits sending and receiving messages with other users. The messages module 250 may include an interface that permits sending and receiving messages with those providing calibration services. In addition, the messages may be synchronized with a messaging application (e.g., iMessages or text messages) a mobile device, such as a mobile phone.

The client portal 200 may include a check statistics module 260. The check statistics module 260 may be used to view a variety of different statistics of interest to the user. For example, the check statistics module may indicate the number of days until the next meeting with the user's parole or Court or judicial officer. For example, the check statistics module may indicate bonuses or rewards, in the form of incentives of some type, earned over time. For example, the check statistics module may indicate the number of passes of the ignition interlock device (e.g., a negative test for substances) and the number of fails of the ignition interlock device (e.g., a positive test for substances), and a ratio thereof. For example, the check statistics module may indicate the amount of time spent driving during each trip, the distance driven during each trip, the average time spent during each trip, and the average distance driven each trip. For example, the check statistics module may indicate the number of times the user has exceeded any temporal boundaries and/or geographic boundaries (described later).

The client portal may include a warmup times module 270. The warmup times module 270 may be used to select the time(s) and/or time period(s) that the ignition interlock module is warmed up by an internal heater. The time(s) and/or time period(s) are passed through the network to the ignition interlock device. The client portal may also query the warmup times from the ignition interlock device through the network to show them to the user. The ignition interlock device may not provide an accurate measurement until the device has been heated by an internal heater and reached a predetermined operating temperature. Accordingly, when the user enters a vehicle, the user may have to wait a significant duration of time while the ignition interlock device is being heated, before the test may be performed, and subsequently the user may drive the vehicle. Thus, by pre-heating the ignition interlock device, the user may avoid or otherwise reduce the wait times. The administrator may also view the warmup times and set the warmup times.

The client portal may include an invoices module 280. The invoices module 280 may include a copy of each invoice that has been paid and those invoices yet to be paid by the user. The user typically pays for activities, such as court fees, administrative fees, and service fees. The system may provide the client reminders that outstanding invoices need to be paid.

The client portal may include any other modules, as desired, to facilitate interaction with the client and other aspects of the system.

Referring to FIGS. 3A-3D, it is desirable for administrators, inclusive of parole officers, system administrators, distributors, location managers, Court and judicial staff, (all of which are generally referred to as administrators) to have an Internet based administrative portal 300 that may be accessed by any network enabled device, such as a mobile phone, computer tablet, laptop computer, and/or desktop computer. The Internet based portal may be in the form of a webpage, a progressive web application, a desktop/laptop/tablet based application, a mobile device based application, or otherwise. In general, the client and the user may be used interchangeably. Data from the administrative portal 300 may be downloaded in any suitable manner to the ignition interlock device and/or changed with the client portal 200. Data from the ignition interlock device may be uploaded in any suitable manner to the administrative portal 300.

The administrative portal 300 may include a register module 310. The register module 310 permits the administrators to register with the system, preferably with a combination of a user name 312 and a password 314 and their role as an administrator (e.g., parole officer, judicial staff, system administrator, etc.). The registration also preferably includes the administrator identifying the state or states 316 in which the administrator is responsible for that necessitated the use of the system. For example, a parole or judicial staff may select a single state, such as California. For example, a system administrator may select all states. The administrative portal 300 may select those options to provide to the administrator suitable data and options based upon the state(s) being selected. In this manner, the administrative portal is customized to the particular needs of the particular administrator.

The administrator portal 300 may include a login module 320. The login module 320 permits the administrator to log into the system, preferably using the combination of a user name 322 and a password 324 the user selected as a result of their use of the register module 310. The administrator based upon their status as an administrator is permitted to access portions of the system and not permitted to access other portions of the system.

The administrator portal 300 may include a reset password module 228. The reset password module 328 permits the administrator to reset their password to use the system. Preferably, the system requires the administrator to enter their user name, in which a two-factor authentication is used to reset the password, such as a text message, phone call, or e-mail message.

The administrator portal 300 may include an appointment management module 330. The appointment management module 330 may provide an interface for listing previous and future appointments 332, an interface for adding additional appointments 333, an interface for editing existing appointments 334, and for removing existing appointments 335. For example, the appointments may be a parole officer appointment, a court related appointment, a service appointment for servicing the ignition interlock device, or otherwise. The appointments may be modified by any user with access to the administrator portal 300. When an appointment is added, removed, and/or edited, the changes are reflected within the appointments module 240 of the client portal 200. When an appointment is added, removed, and/or edited in the client portal 200, the changes are reflected within the appointment management module 330 of the administrative portal 300. In addition, when an appointment is added, removed, and/or edited, a communication, such as in the form of a phone call, text message, or e-mail may be automatically sent to the client based upon their contact information. The system may automatically send reminders to the client and/or administrator, such as in the form of a phone call, text message, or e-mail, before an appointment. For example, the reminders may be sent 14 days, 7 days, and 1 day before an appointment. This reminder system ensures that the client is aware of the appointment and also creates a record of the client being reminded of the appointment.

The administrator portal 300 may include a client management module 340. The client management module 340 may provide an interface for listing clients 342 that a particular user has a relationship with (e.g., clients of court or parole officer; clients of location service), adding additional clients 343, editing existing clients 344, and removing existing clients 345. The client management module 340 may provide an interface for adding comments 346 to document any activities that may be desired later for reference. In addition, the comments 346 provides the capability of different entities to share information about a particular client. The system may automatically send welcome message to the client, such as in the form of a phone call, text message, or e-mail, when the new client is added to the system. This also notifies the new client that they have been added to the system. Also, the welcome message preferably includes log-in information so the client can more easily set up their account in the system. Further, comments may be provided to the client, and the client comments may be provided to any suitable administrator.

The administrator portal 300 may include a device management module 350. The device management module 350 may include listing devices 352 attributed to any administrator or a particular administrator. The device management module 350 may include adding additional devices 353, editing existing devices 354, removing existing devices 355, and associating a particular device with a particular user 356. Each device may be uniquely identified, such as by its MAC address and/or serial number. In this manner, the administrators of the administrative portal 300 may manage the devices being managed by the system, and associate a particular device with a particular client.

The administrator portal 300 may include a vehicle management module 360. The device management module 360 may include listing vehicles 362 attributed to an administrator or a particular administrator. The vehicle management module 360 may include adding additional vehicles 363, editing existing vehicles 364, removing existing vehicles 365, and associating a particular device with a particular vehicle 356. Each vehicle may be uniquely identified, such as by its VIN number. In this manner, the administrators of the administrative portal 300 may manage the devices being managed by the system, and associate a particular device with a particular vehicle. In this manner, the administrators of the administrative portal 300 may manage the devices being managed by the system, and associate a particular device with a particular vehicle and a particular client. In addition, the system may include a database of available vehicles, so that the selection of the vehicle for a particular user may be from the available vehicles, and other information regarding a particular selected vehicle may be automatically included from the database.

The administrator portal 300 may include a geofence management module 370. In many cases, the judicial system (e.g., parole officer, Judge, etc.) may impose geographic restrictions on where the client is permitted to drive the vehicle. The geofence management module 370 may include listing geofences 372 attributed to an administrator or a particular administrator. The geofence management module 370 may include adding additional geofences 373, editing existing geofences 374, removing existing geofences 375, and associating a particular client with a particular geofence 376. Also, temporary exclusions for all geofences and/or temporary additional geofences may be included, such as based upon a temporal time period. For example, the user may have all of their geofences disabled for a week for a vacation. For example, the user may have an additional geofence to include a 3 mile radius around a car service location for a period of 3 days. The system may also require a recently passed test, such as within 2 hours of the event, in order to permit the modified geofence boundary to be effective. In this manner, the administrators of the administrative portal 300 may manage the geofences being managed by the system, and associate a particular geofences with a particular vehicle. In this manner, the administrators of the administrative portal 300 may manage the geofences being managed by the system, and associate a particular geofence with a particular vehicle and a particular client. In the event that geofence violations are determined by the geofence management module 370, based upon data from the ignition interlock device, alerts may be provided to a suitable administrator. For example, data regarding the geographic location of the ignition interlock device may be continually streamed or periodically streamed to the administrator portal 300 which then compares the data against the respective geofence(s). If a geofence(s) violation occurs, the suitable administrator may be contacted in a timely manner, who may in response, directly contact the client to inquire why the violation is occurring.

Figure 4:
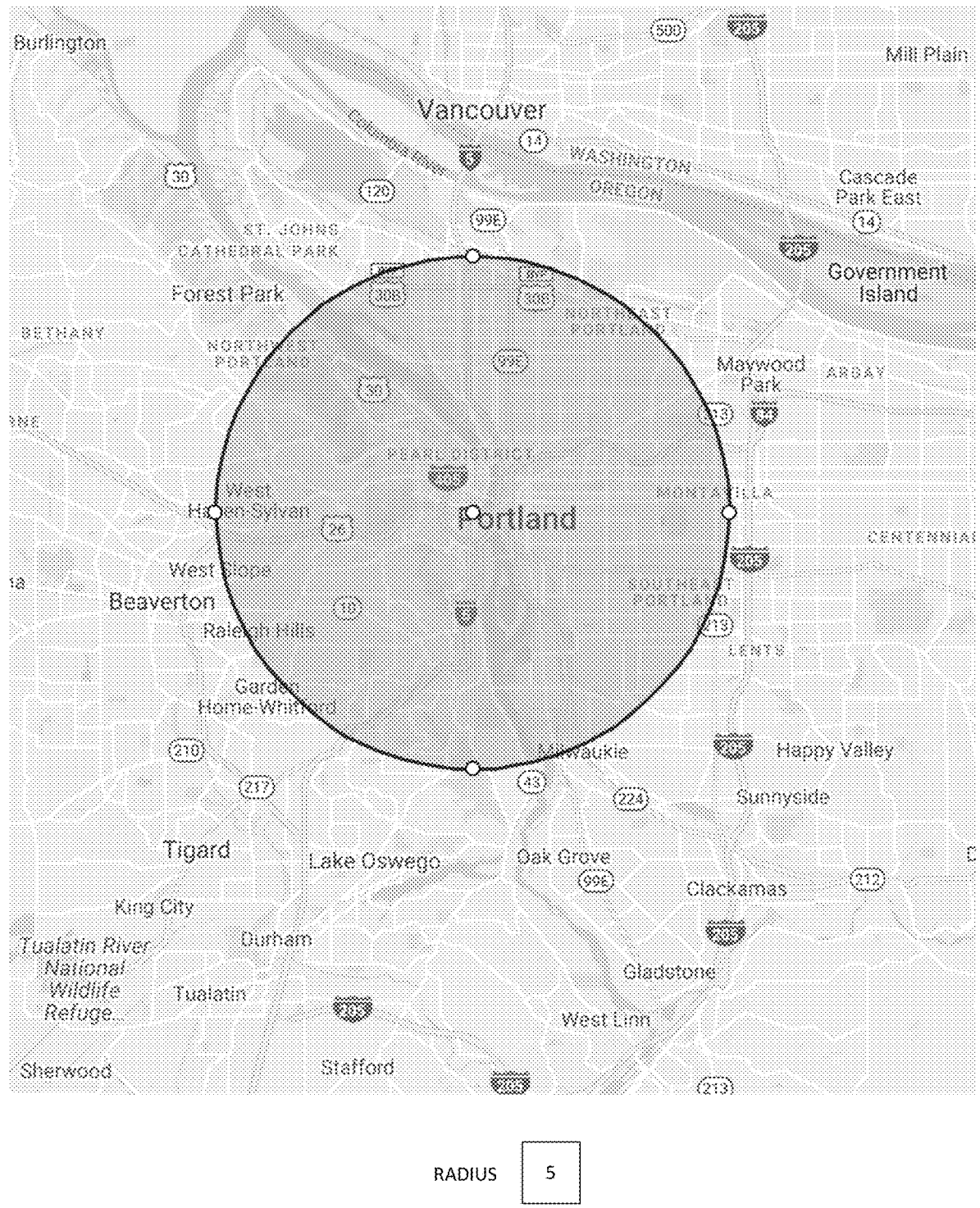
FIG. 4 illustrates a map with a radius.
Figure 5:
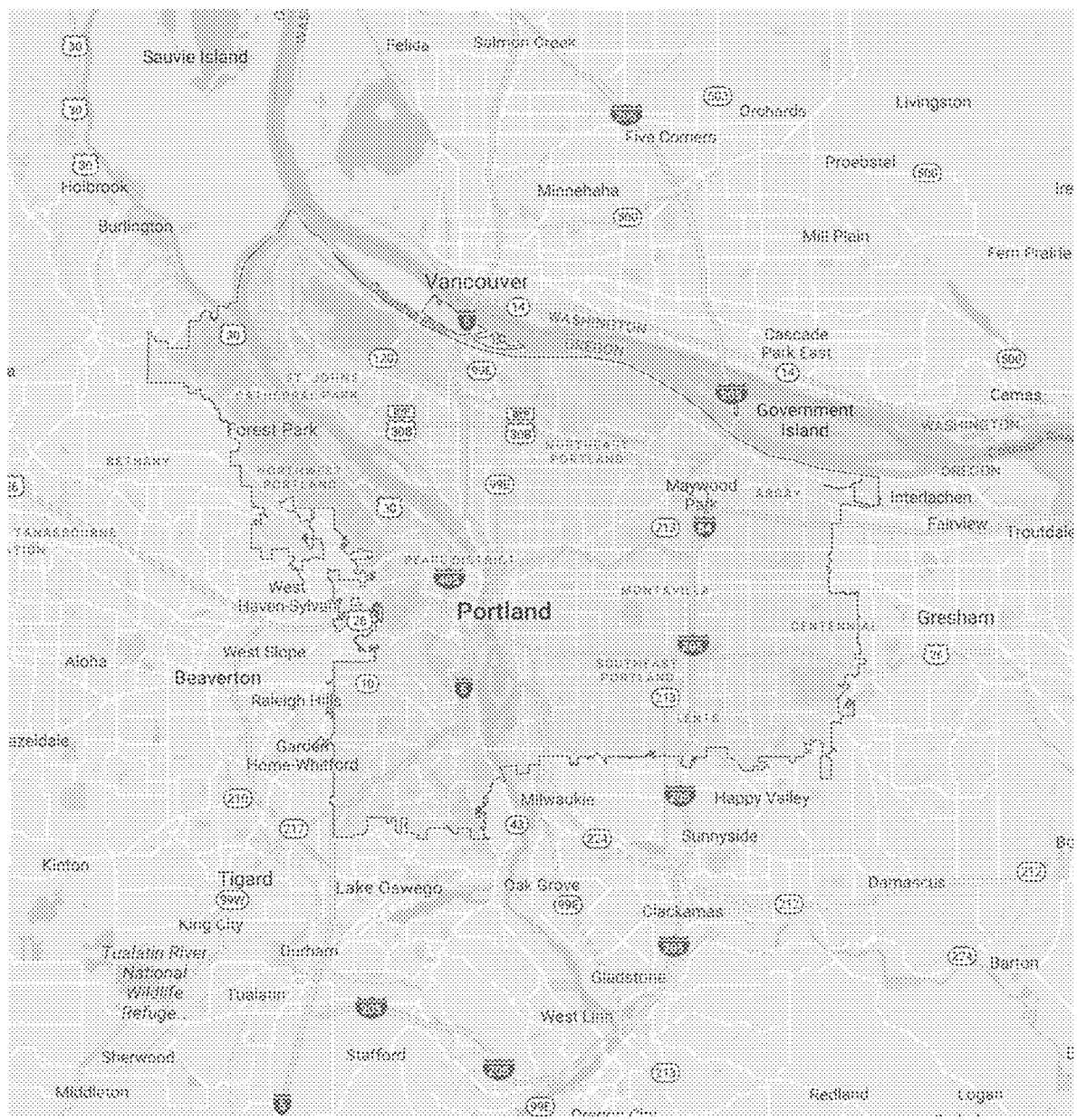
FIG. 5 illustrates a map with a city boundary.
Figure 6:
FIG. 6 illustrates a map with a rectangular region.

Referring also to FIG. 4, by way of example, the geographic restriction may include a 5 mile restriction (or other selected distance) around the client's home which provides for shopping and travel to and from the client's location of employment. Referring also to FIG. 5, by way of example, the geographic restriction may include a city limits restriction around the client's home which provides for shopping and travel to and from the client's location of employment. Referring also to FIG. 6, by way of example, the geographic restriction may include a zone generally aligned with the client's home and travel to and from the client's location of employment. The administrator may use an interface to designate the geofence for each client, such as by designating a radius around the client's home, a city, a county, or a geographic region drawn on the map.

The geofence management module 370 may track and store the geographic movement of each of the client's in their vehicle, based upon continually streamed, periodically streamed, downloaded data during servicing, or otherwise. The geofence management module 370 may selectively send a boundary alert to the client when they cross over a geofence boundary. The geofence management module 370 may selectively send a boundary alert to the probation officer, the Court, the administrator, or otherwise when they cross over a geofence boundary. The geofence management module 370 may store the boundary crossing event that may be viewed within the geofence management module 370. The geofence management module 370 may present the boundary crossing event and the geographic movement of the client within the geofence management module 370.

The administrator portal 300 may include a location management module 380. The location management module 380 may include a listing of locations 382 that the device may be processed to obtain data from it, such as testing, calibration, and geofence data. The location management module 380 may include adding additional locations 383, editing existing locations 384, removing existing locations 385, and associating a particular device with a particular location 386. In addition, the location management module 380 may be used to schedule an appointment for service 388. The location management system 380 may also be used to set up alerts 389 to notify the client of the need to set up an appointment 388. Upon setting up an appointment, a geofence boundary around the appointment location, such as a radius of 3 miles, may by automatically added for a limited temporal duration, such as 1 day. Also, it is preferable that the geofence for the appointment location overlaps with the other geofence location(s) so that travel may be achieved to the appointment location without a violation occurring. This permits the user to go to the location without the system identifying such a location as a possible geofence violation. The system may also require a recently passed test, such as within 2 hours of the appointment, in order to permit the modified geofence boundary to be effective. In this manner, the administrators of the administrative portal 300 may manage the locations being managed by the system, and associate a particular device with a particular location for service. The service may be included on the client's calendar, as desired.

The administrator portal 300 may include a repair management module 390. The repair management module 390 may include listing of repair locations 392 that the device may be repaired. The repair management module 390 may include adding additional repair locations 393, editing existing repair locations 394, removing existing repair locations 395, and associating a particular device with a particular service repair location 396. Upon setting up a repair location, a geofence boundary around the repair location, such as a radius of 2 miles, may by automatically added for a limited temporal duration, such as 2 days. Also, it is preferable that the geofence for the repair location overlaps with the other geofence location(s) so that travel may be achieved to the repair location without a violation occurring. This permits the user to go to the repair location without the system identifying such a location as a possible geofence violation. The system may also require a recently passed test, such as within 2 hours of the repair appointment, in order to permit the modified geofence boundary to be effective. In addition, the repair management module 380 may be used to schedule an appointment for repairs 398. The repair management system 390 may also be used to set up client alerts 399 to notify the client of the need to set up an appointment 398 for repair.

The administrator portal 300 may include a vehicle management module 400. The vehicle management module 400 may include listing of vehicles 402. The vehicle management module 400 may include adding additional vehicles 403, editing existing vehicles 404, removing existing vehicles 405, and associating a particular device with a particular vehicle 406. In this manner, the system is aware of which vehicle(s) are attributed and associated with which device(s) and client(s).

The administrator portal 300 may include a restricted driving module 410. The restricted driving module 410 may include listing of restricted driving violations 412. The restricted driving module 410 may include adding restricted driving violations 413, editing restricted driving violations 414, removing restricted driving violations 415, and associating a particular restricted driving violations with a particular client 416. In this manner, the system is aware of which restricted driving violations are attributed and associated with which device(s) and client(s). This feature may be used to monitor the client's driving during different times of the day, speeds which the user may be traveling, which may not be permitted. For example, a client may only be permitted to drive during 7 am until 6 pm, and will log events outside of this time frame as a driving violation. For example, by correlating the speed with the particular road, the system may determine if the speed of the client exceeds the posted speed limit. The administrator portal 300 may download this data to the interlock device or the interlock device may track its usage, location, time, etc., so that the data can be compared against the restrictions. Moreover, the administrator portal 300 may send e-mails or other information to a suitable recipient (e.g., administrator, judicial officer, parole officer, etc.) each time the administrator portal 300 becomes aware of a restriction violation. For example, the ignition interlock device may communicate wirelessly with a network (e.g., Internet) to provide data of its location, time, previous path, etc., to the system which may use the data to provide such notices on a near-real-time basis.

The administrator portal 300 may include a state reporting module 420. The state reporting module 420 may include listing of state reporting records 422. The state reporting module 420 may include adding state reporting records 423, editing state reporting records 424, removing state reporting records 425, and associating state reporting records with a particular client 426. In this manner, the system is aware of which state reporting forms are attributed and associated with which device(s) and client(s). In this manner, the system may file or otherwise make available for filing, the forms for particular states for the particular client. In addition, the system may update itself of the status of the reports submitted to the state. If the form was rejected or otherwise denied, then the system may indicate that the report should be modified and submitted again.

The administrator portal 300 may include an invoicing module 430. The invoicing module 430 permits the administrator to create invoices, send invoices to clients and others, and check whether particular invoices have been paid. Also, the system may lock out the interlock device if one or more invoices are past due, so that in this manner the interlock device will not permit the vehicle to operate until all the invoices are paid in a timely manner.

The administrator portal 300 may include a map tracking module 440. The map tracking module 440 may plot the current GPS location of each and every ignition interlock device within a selected defined geographic region so that the administrator may view the location and movement of each of the ignition interlock devices. Each of the devices may be represented in a different manner, such as color coded, based upon the state of the particular client. For example, if the ignition interlock device of a client is out of their geographic and/or time restrictions it may be colored red, and otherwise colored green. For example, if the ignition interlock device of a client has one or more failed breath tests it may be colored red, and otherwise colored green. Also, the administrator may directly contact the client to resolve the violation.

Figure 7:
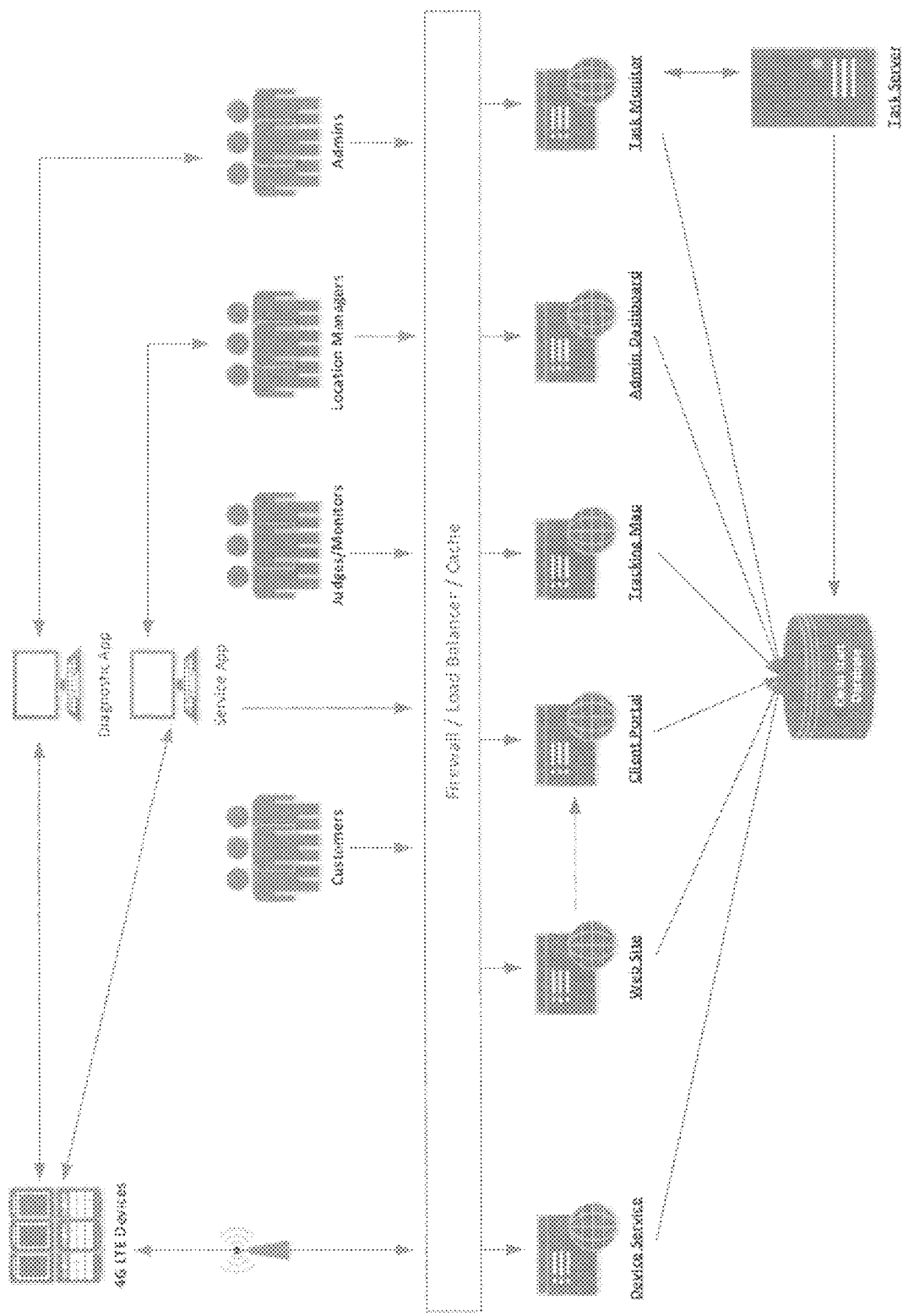
FIG. 7 illustrates a client-server system for the ignition interlock devices.

FIG. 7 illustrates an ignition interlock device system that includes server(s), database(s), device service, web site, client portal, tracking map, admin dashboard, and a task monitor. The ignition interlock device system may further include mobile devices, service app, diagnostic app, customers, judges/monitors, location managers, and administrators. If desired, the system may include a firewall/load balancer/cache.

Figure 8:
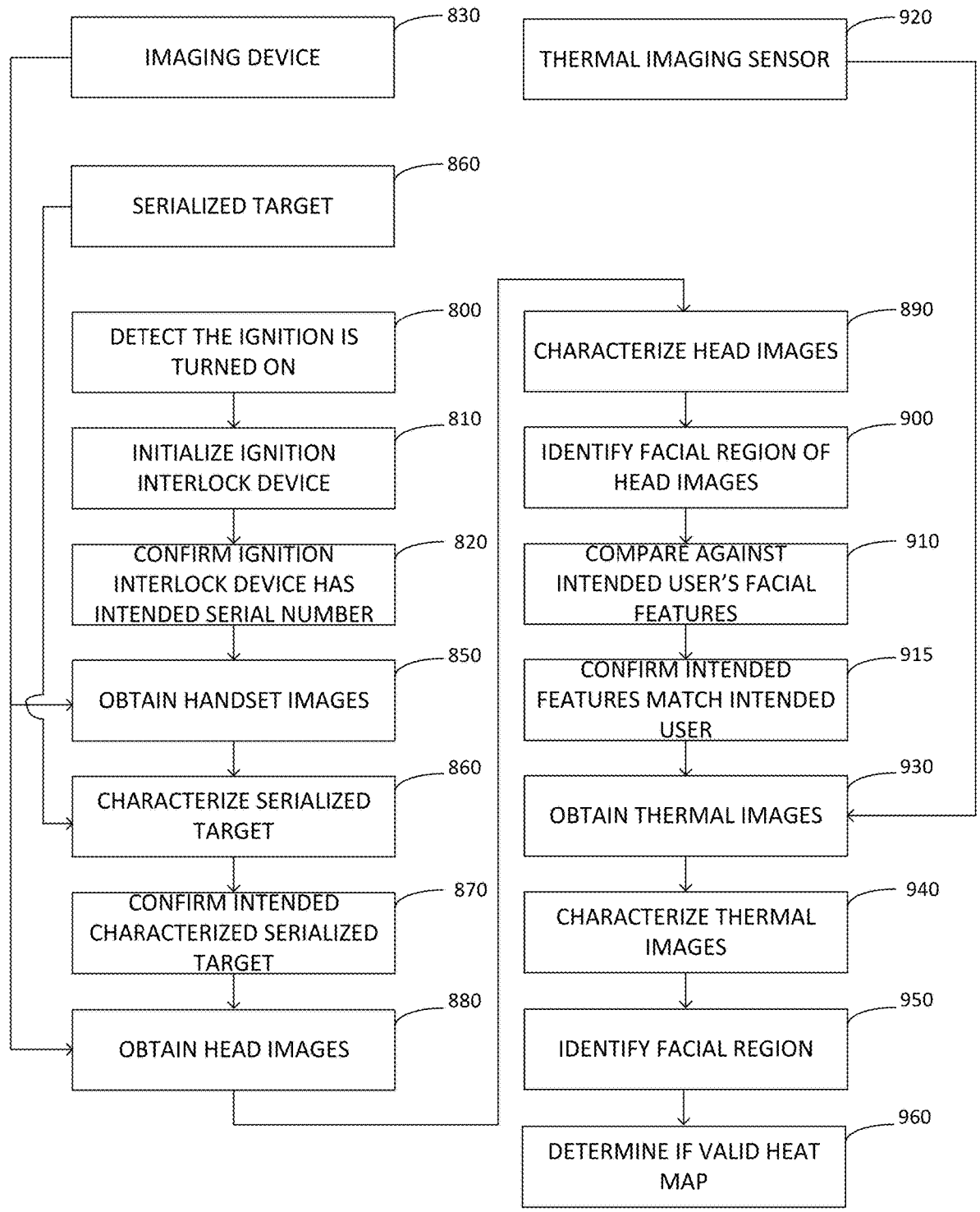
FIG. 8 illustrates a system for driver verification.

In many cases, it is desirable to include relatively secure ignition interlock systems so that it is difficult for the user to bypass or otherwise circumvent the ignition interlock device. Referring to FIG. 8, the process by which the vehicle is enabled for starting by the ignition interlock device may include the ignition interlock device or other device detecting that the ignition 800 is turned on. The ignition interlock device is preferably initialized 810 upon detecting that the ignition 800 is turned on, if it is not otherwise initialized. As an initial matter, it is desirable to confirm that the proper ignition interlock device is interconnected with the vehicle, rather than one that has otherwise been exchanged by the user. For example, initially the system may confirm that the ignition interlock device has the intended identification number 820, such as a serial number and/or a MAC address and/or otherwise a unique identifier, which may be confirmed against a local and/or remote database with the corresponding identification number. The confirmation of the intended identification number 820 is an initial confirmation that the intended ignition interlock device is present. Further, the system may obtain the identification number before, during, and/or after the test is performed. In this manner, prior to the test the system may confirm the proper ignition interlock device is being used. In this manner, during the test the system may confirm the proper ignition interlock device is being used. In this manner, after the test the system may confirm the proper ignition interlock device was being used. An alert may be provided to an administrator if an improper identification number is detected.

Figure 9:
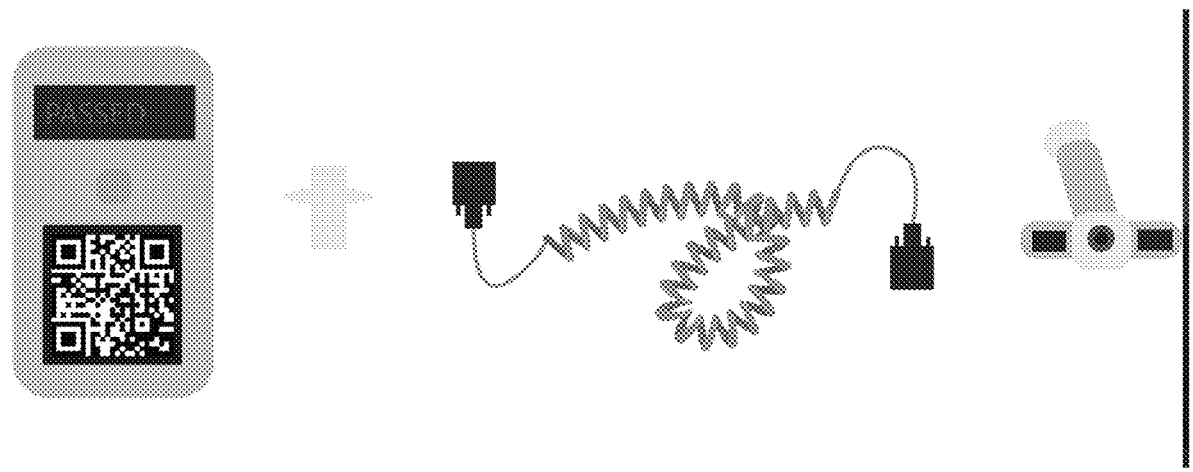
FIG. 9 illustrates an ignition interlock device with a serialized code.

For example, initially the system may also (or alternatively) visually confirm that the ignition interlock device being used is in fact the ignition interlock device connected to the vehicle. The vehicle may include an installed imaging device 830 that is directed toward the driver's seat area, such as being mounted on a dashboard of the vehicle, with a relatively wide field of view so that the upper region of the driver's seat area is within the field of view of the imaging device 830. The ignition interlock device may include a serialized target 840 on the handset of the ignition interlock device, which is movable within the vehicle typically based upon a flexible interconnection, with the serialized target 840 being affixed to the handset. The serialized target may be a visually recognizable pattern, such as for example a bar code or a QR code (see FIG. 9). The user may position the serialized target 840 in the field of view of the imaging device 830, and the system may obtain one or more handset images 850 of the serialized target 840 and characterize 860 the serialized target 840 by determining the content encoded therein, such as a serial number. The system may confirm that the characterized serialized target 860 of the ignition interlock device has the intended characterized serialized target 870, such as the content of the characterized serialized target, which may be confirmed against a local and/or a remote database with the corresponding characterized serialized target. Preferably, the system does not include additional light and/or reflective materials that are used to identify and characterize the serialized target which reduces inaccuracies as a result of environmental conditions. Further, the system may obtain images of the serialized target before, during, and/or after the test is performed. In this manner, prior to the test the system may confirm the proper ignition interlock device is being used. In this manner, during the test the system may confirm the proper ignition interlock device is being used. In this manner, after the test the system may confirm the proper ignition interlock device was being used. An alert may be provided to an administrator if an improper serialized target is detected.

Figure 10:
FIG. 10 illustrates a facial recognition system.

For example, the system may also visually confirm that the driver in the driver's seat using the ignition interlock device that is going to drive the vehicle is in fact the actual user of the ignition interlock device, rather than a third party taking the test on behalf of the driver. The installed imaging device 830 that is directed toward the driver's seat area, such as being mounted on a dashboard of the vehicle, has a relatively wide field of view so that the upper region of the driver's seat area is within the field of view of the user, including the driver's face. The user positions their face within the field of view of the imaging device 830, and the system may obtain one or more head images 880 of the user's face. The system may then characterize 890 the head images 880 that include the user's face. The system may identify the facial region 900 of the head images 880 using any suitable facial identification technique (see FIG. 10). Once the facial regions of the head images 880 are identified 900, the system then compares the identified 900 facial regions of the head images 880 to a local and/or a remote database that includes data representative of the intended user's facial features 910. Preferably, the data representative of the intended user's facial features for the particular ignition interlock device is previously downloaded to the ignition interlock device so that the system is more responsive, and also is operational in areas without remote data connectivity. The selection of the intended user's facial features 910 may be based upon the user that corresponds to the characterized serialized target and/or the identification number. The system may confirm 915 that the identified 900 facial regions of the head images 880 correspond with the intended user's facial features 910 so that the intended person is using the ignition interlock device. Further, the system may obtain the head images 880 that include the facial regions before, during, and/or after the test is performed. In this manner, prior to the test the system may confirm the intended user is using the ignition interlock device. In this manner, during the test the system may confirm the intended user is using the ignition interlock device. In this manner, after the test the system may confirm the intended user is using the ignition interlock device. An alert may be provided to an administrator if an improper user is detected.

For example, the system may also thermally confirm that the driver in the driver's seat using the ignition interlock device that is going to drive the vehicle is in fact the intended user of the ignition interlock device, rather than a user wearing a hockey mask or a printed mask masquerading as the intended user. The installed imaging device 830 may include a thermal imaging sensor 920 that is directed toward the driver's seat area, such as being mounted on a dashboard of the vehicle, that has a relatively wide field of view so that the upper region of the driver's seat area is within the field of view of the thermal imaging sensor 930, including the driver's face. The user positions their face within the field of view of the thermal imaging sensor 920, and the system may obtain one or more thermal images 930 of the user's face. The system may then characterize 940 the thermal images 930 that include the user's face. The system may identify the facial region 950 of the thermal images 930 using any suitable facial identification technique. Once the facial regions of the thermal images 930 are identified 950, the system then determines 960 if the identified 940 thermal images 930 are a valid heat map of a user, such as one that does not include a mask of any type which would result in a different surface temperature profile. Normally, the heat map is not particular to an individual user, but rather applicable to a generalized class of potential users. Preferably, the data representative of a valid heat map is included within the ignition interlock device, rather than a remote database, so that the system is more responsive, and also is operational in areas without remote data connectivity. Further, the system may obtain the thermal images 930 that include the facial regions before, during, and/or after the test is performed. In this manner, prior to the test the system may confirm the intended user is using the ignition interlock device. In this manner, during the test the system may confirm the intended user is using the ignition interlock device. In this manner, after the test the system may confirm the intended user is using the ignition interlock device. An alert may be provided to an administrator if an improper user is detected.

Once the system has validated the serialized target and/or identification number, the facial recognition of the user, and the thermal profiles of the user, the ignition interlock device is enabled to permit subsequent testing, such as an alcohol test. The testing may be performed, as previously described. In addition, to create a more robust record of the user's interaction with the ignition interlock device the imaging device and/or thermal sensor may capture a video sequence from a time before the testing is performed, during the time in which the testing is performed, to a time after the testing is performed. In this manner, the record includes a video sequence of the entire testing procedure, which may be reviewed in the future. Also, preferably, the video sequence is transmitted to and stored in a remote database associated with the particular user when data connectivity is available.

Figure 11:
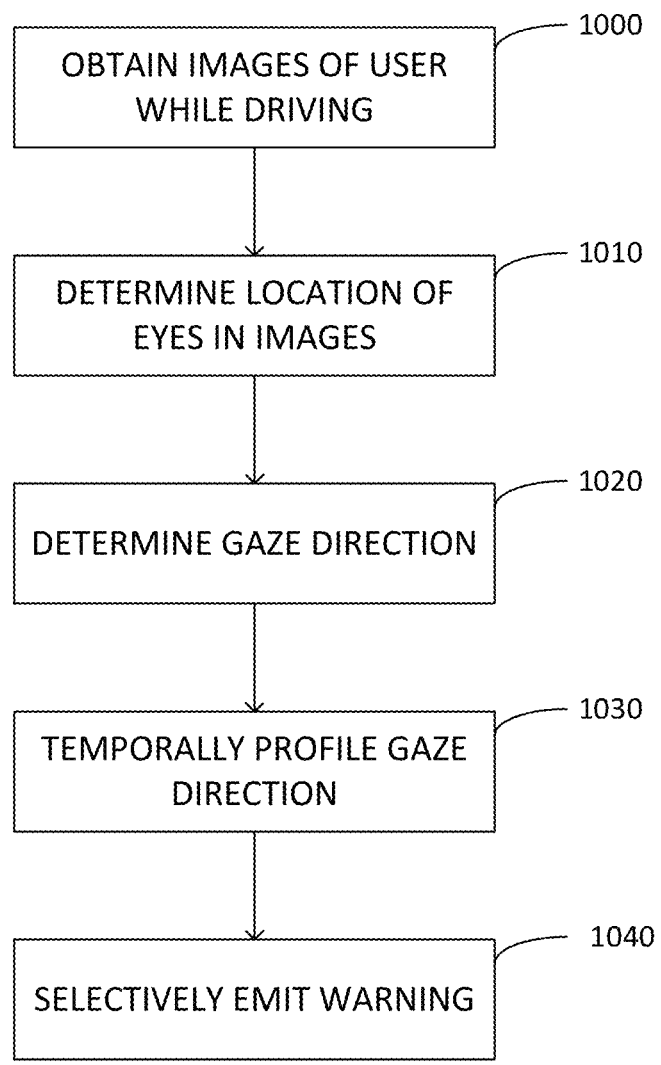
FIG. 11 illustrates a gaze detection system.

Referring to FIG. 11, while the engine is running, after a successful use of the interlock ignition device, the system may continuously and/or periodically monitor the user for distracted driving. The imaging device and/or the thermal imaging device may obtain images 1000 of the user while driving, such as when the vehicle is determined to be in motion. The obtained images may be processed to determine the location of the face of the driver and then the eyes of the driver within the face 1010. The direction of the gaze of the eyes of the viewer may be determined for the obtained images 1020. The gaze direction may be temporally profiled 1030. In the case that the gaze direction over time indicates that the driver is sufficiently distracted, such as being greater than a threshold, then the ignition interlock device may emit a warning to the driver 1040, such as an audible or visual warning. Further, the system may send a text message and/or an e-mail alert to the user and/or the administrator detailing the distracted driving.

Figure 12:
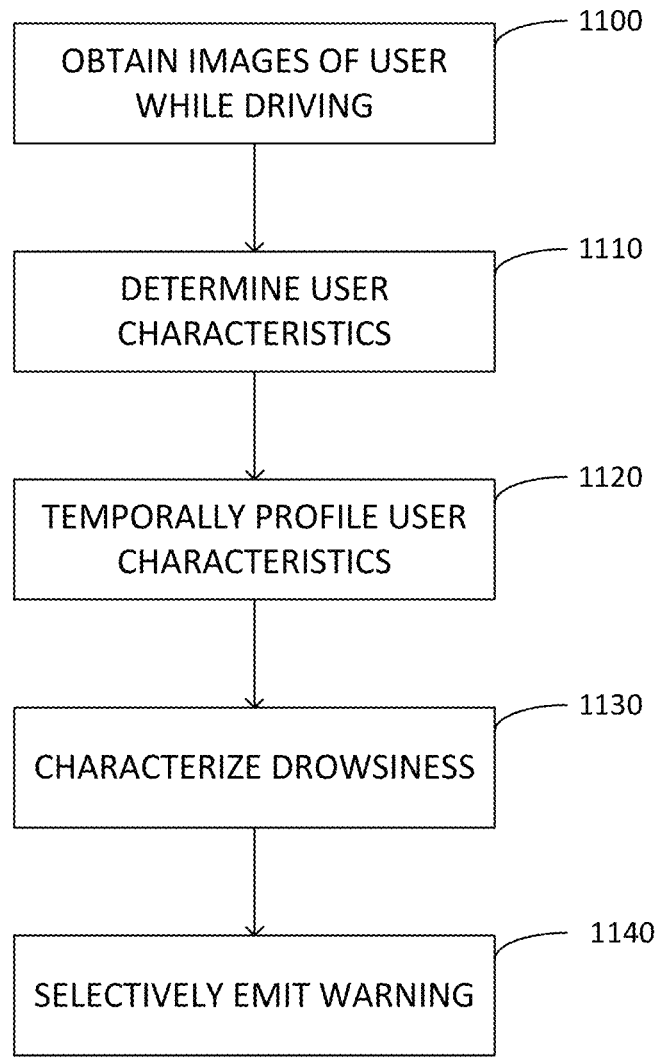
FIG. 12 illustrates a drowsiness detection system.

Referring to FIG. 12, while the engine is running, after a successful use of the interlock ignition device, the system may continuously and/or periodically monitor the user for drowsiness. The imaging device and/or the thermal imaging device may obtain images 1100 of the user while driving, such as when the vehicle is determined to be in motion. The obtained images may be processed to determine the location of the face of the driver, the eye region of the driver within the face, the driver's head position, the driver's facial expression, and/or the driver's blinking rate 1110. The eye region of the driver within the face, the driver's head position, the driver's facial expression, and/or the driver's blinking rate may be temporally profiled 1120 to determine a doziness characterization 1130. In the case that the drowsiness characterization over time indicates that the driver is sufficiently drowsy, such as being greater than a threshold, then the ignition interlock device may emit a warning 1140 to the driver, such as an audible or visual warning. Further, the system may send a text message and/or an e-mail alert to the user and/or the administrator detailing the drowsy driving.

The system may be implemented using a computer-readable medium that may be any available medium that may be accessed by the processor. The computer-readable medium may include both a volatile and a nonvolatile medium, a removable and non-removable medium, and a storage medium. The storage medium may include RAM, flash memory, ROM, erasable programmable read-only memory (EPROM), electrically erasable programmable read-only memory (EEPROM), registers, hard disk, a removable disk, a compact disk read-only memory (CD-ROM), or any other form of storage medium. The processor may be operatively coupled via a bus to a display, such as a Liquid Crystal Display (LCD). The display may display information to the user. A keyboard and a cursor control device, such as a touch screen, can also be operatively coupled to bus to enable the user to interface with system.

The processor may be operatively coupled via the bus to one or more databases. The database may store data in an integrated collection of logically-related records or files. The database may be an operational database, an analytical database, a data warehouse, a distributed database, an end-user database, an external database, a navigational database, an in-memory database, a document-oriented database, a real-time database, a relational database, an object-oriented database, a NoSQL database, or any other database, or any combination thereof.

The memory may store software modules that provide functionality when executed in combination with the processor. The modules can include a data visualization module. The data visualization module may include a data visualization application that can collect, organize, synchronize, and display case data. The data visualization module may comprise a plurality of modules that each provide specific individual functionality for collecting, organizing, synchronizing, entering, modifying, and displaying data. The memory may also store an operating system. The operating system may provide operating system functionality for the system. The memory may also store one or more additional applications to include additional functionality for an overall system.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention. Project type configurations may be created automatically by the system or by the user of the system through an interface. The resulting project types may result in outputs suitable for use in the data models and the workflow models.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. An ignition system that includes an ignition interlock device comprising:
    (a) said ignition interlock device including a first interconnection suitable to selectively inhibit an ignition of a vehicle;
    (b) said ignition interlock device including a sensor suitable to sense a breath of a user and in response selectively inhibiting said ignition of said vehicle;
    (c) said ignition interlock device receiving configuration information from a wireless connection;
    (d) said ignition interlock device providing a plurality of geographic locations of said ignition interlock device over time to an associated portal operating on a computing device accessible through said wireless connection;
    (e) said portal including a geofence management module that defines one or more geofences for said ignition interlock device that defines one or more geographic regions associated with said interlock device;
    (f) said portal configured to:
        (i) receive user input data to establish one or more arbitrarily chosen temporary geofences,
        (ii) receive user input data to establish one or more permanent geofences, modify one or more existing geofences, remove one or more existing geofences,
        (iii) receive user input data to establish one or more time frames,
        (iv) receive user input data to modify one or more existing time frames, and
        (v) receive user input data to remove one or more existing time frames,
    said portal configured to send selected said user input data to said interlock device through said wireless connection;
    (g) said portal including a restricted driving module that determines whether any of said plurality of geographic locations are outside any of said geographic regions associated with said interlock device;
    (h) said restricted driving module signaling a violation of any of said geographic regions based upon any of said plurality of geographic locations being determined to be outside said one or more geographic regions, and signaling a violation of said time frames based upon a change in said geographic locations outside of said time windows.

2. The ignition system that includes the ignition interlock device of claim 1 wherein said sensor includes an alcohol sensor.

3. The ignition system that includes the ignition interlock device of claim 1 wherein in response to sensing said breath of said user permitting said ignition to start the engine of said vehicle.

4. The ignition system that includes the ignition interlock device of claim 1 further comprising said ignition interlock device selectively downloading through said wireless connection a digital package containing firmware, said ignition interlock device installing said firmware on said ignition interlock device, and thereafter automatically rebooting said ignition interlock device to use said firmware for subsequent operation rather than previous firmware installed upon said ignition interlock device.

5. The ignition system that includes the ignition interlock device of claim 4 wherein said wireless connection is a cellular connection.

6. The ignition system that includes the ignition interlock device of claim 1 further comprising an associated portal accessible through a network connection using a computing device.

7. The ignition system that includes the ignition interlock device of claim 6 wherein said portal includes a registration module that receives a user name and a password to permit a user to access said portal, and a state name that identifies at least one of a state and a state court proceeding associated with said user.

8. The ignition system that includes the ignition interlock device of claim 7 wherein said ignition interlock device receives a different firmware and the operation of said firmware is based upon said state name.

9. The ignition system that includes the ignition interlock device of claim 6 wherein said portal includes an appointment module that identifies a user appointment, where said user appointment includes a date, a time, and a location for said user.

10. The ignition system that includes the ignition interlock device of claim 6 wherein said portal includes an appointment module that identifies a calibration appointment that includes information for recalibration of said ignition interlock device.

11. The ignition system that includes the ignition interlock device of claim 6 wherein said portal includes a message module that receives messages from a sender and provides messages to said sender.

12. The ignition system that includes the ignition interlock device of claim 11 wherein said sender includes at least one of (a) a parole officer, (b) a Judge, (c) a court staff of said Judge.

13. The ignition system that includes the ignition interlock device of claim 6 wherein said portal includes a statistics module that indicates a number of negative tests of said ignition interlock device.

14. The ignition system that includes the ignition interlock device of claim 6 wherein said portal includes a statistics module that indicates said vehicle associated with said ignition interlock device exceeding a geographic boundary.

15. The ignition system that includes the ignition interlock device of claim 6 wherein said portal includes a warmup times module selecting at least one time to preheat said ignition interlock device.

16. The ignition system that includes the ignition interlock device of claim 6 wherein said portal includes a vehicle management module that identifies a plurality of vehicles and associates said plurality of vehicles with a plurality of said users.

17. The ignition system that includes the ignition interlock device of claim 1 said ignition interlock device automatically verifies it is installed with an intended said vehicle.

18. The ignition system that includes the ignition interlock device of claim 1 wherein said ignition interlock device includes an imaging device that is used to image a face of said user which is used to said selectively inhibiting said ignition of said vehicle.

19. The ignition system that includes the ignition interlock device of claim 1 wherein said ignition interlock device includes an imaging device that is used to image a code affixed to said ignition interlock device which is used to said selectively inhibiting said ignition of said vehicle.

20. The ignition system that includes the ignition interlock device of claim 18 wherein said imaging device is a thermal imaging sensor.

* * * * *